United States Patent
Houlberg et al.

(10) Patent No.: US 7,183,970 B1
(45) Date of Patent: Feb. 27, 2007

(54) MISSILE TIME-SPACE-POSITION-INFORMATION UNIT TEST SOFTWARE

(75) Inventors: Christian L. Houlberg, Ventura, CA (US); Gary Glazner, Lancaster, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 182 days.

(21) Appl. No.: 11/053,757

(22) Filed: Jan. 31, 2005

(51) Int. Cl.
*G01S 1/02* (2006.01)
(52) U.S. Cl. .............................. 342/357.06
(58) Field of Classification Search ........... 342/352, 342/357.01, 357.06; 701/207, 213, 215
See application file for complete search history.

(56) References Cited

U.S. PATENT DOCUMENTS

| | | | |
|---|---|---|---|
| 5,923,287 A * | 7/1999 | Lennen | 342/357.06 |
| 7,043,343 B1* | 5/2006 | Houlberg et al. | 701/1 |
| 2002/0003491 A1* | 1/2002 | Heppe | 342/357.1 |
| 2005/0031125 A1* | 2/2005 | Acampora et al. | 380/270 |

\* cited by examiner

*Primary Examiner*—Dao L. Phan
(74) *Attorney, Agent, or Firm*—David S. Kalmbaugh

(57) ABSTRACT

Computer software for testing the performance a Joint Advanced Missile Instrumentation Time-Space-Position Information Unit (JTU). The computer software is utilized for Functional, Acceptance and Qualification test of the JTU. The software has the capability of bench test the JTU and field testing the JTU to verify and document functionality of the JTU prior to use of the JTU in an operational environment.

20 Claims, 10 Drawing Sheets

MISSILE TIME-SPACE-POSITION-INFORMATION UNIT TEST SOFTWARE

BACKGROUND OF THE INVENTION

1. Field of the Invention

The present invention relates generally to the testing of tracking equipment used in missiles, or targets. More particularly, the present invention relates to the testing of a missile or target's time-space-position information unit using multiple hardware configurations and a computer software program developed for the information unit.

2. Description of the Prior Art

The Joint Advanced Missile Instrumentation (JAMI) Time-Space-Position Information (TSPI) Unit (JTU) is a relatively small, high dynamic, airborne component that provides Global Positioning System (GPS) and Inertial Measurement Unit (IMU) measurements that are processed on the ground for the tracking of missiles and targets. The JTU consists of five primary internal components (1) an internal GPS sensor; (2) an Inertial Measurement Unit; (3) a Data Acquisition System; (4) a Digital Interface processor; and (5) a Power System.

The internal GPS sensor accepts external RF antenna input that may or may not (depending upon the platform) be conditioned by an external filter/limiter/amplifier. The GPS sensor can monitor and time tag three external event discrete items for incorporation into its outer data stream. The Inertial Measurement Unit generates signals from internal tri-axially mounted accelerometers and rate sensors which are combined with burst-mode GPS/Event data and formatted for output by an internal processor.

The JTU Data Acquisition System outputs a data stream formatted for telemetry transmission via a serial port. This data is sent to the external missile telemetry system for transmittal to a JAMI TSPI Ground Unit. The Digital Interface processor functions as an internal communications controller hub. The processor formats GPS serial port programming data before forwarding it to the GPS sensor. The processor merges GPS/Event data with IMU data, monitors mode selection inputs, and converts output data to a selected format (RS-232, RS-422, or parallel) for inclusion in the data stream.

The power system operates over a voltage range from +24 to +32 volts DC consuming less than 5 watts of power. The JTU filters this external power and feeds internal DC/DC converters which power the GPS sensor; Inertial Measurement Unit; Data Acquisition System; and Digital Interface processor within the JTU.

There is currently no testing device available to the military to test the Joint Advanced Missile Instrumentation Time-Space-Position Information Unit. There is, however, a need for a testing device to insure that the JTU is providing accurate and reliable information when it is being used to test the performance of a missile or other projectile during flight.

SUMMARY OF THE INVENTION

The present invention comprises a Time-Space-Position-Information Unit Message Structure (TUMS) Data Real-Time Comparator (TDRC) which is a computer software program that is used to test the performance of the JTU. This program includes three support files and is designed to run in a Microsoft Windows 2000 operating system environment hosted on a standard 750 MHz or faster desktop PC. Prior to using the program the user must check a JTU_Test.ini initialization file to ensure that the initialization values are set appropriately for the JTU under test.

The computer software program utilizes three serial interfaces. The three serial interfaces are used to control a Test Set and/or to communicate with a Reference Receiver and/or to receive data from the JTU under test. When the test set is used the interfaces are implemented via a Universal Serial Bus (USB) port. When the Test Set is not used the Reference Receiver and JTU interfaces may be implemented via the RS-232 ports of a test computer.

The three serial interfaces allow the user to perform the following four tests using the computer software program of the present invention. The first test is a test of the Inertial Measurement Unit (IMU) component of the JTU. IMU data is received from the JTU in a TUMS format. This data is displayed and compared with IMU test criteria established by the user. At the beginning of the test the user has the option of saving the JTU TUMS data stream to a file (filename.imu) for later playback and analysis. This provides the capability of performing a quick test of the three accelerometers and the three rate sensors comprising the JTU IMU.

The second test is a functional test of both the GPS and IMU components of the JTU. The GPS and IMU data comes from the JTU in a TUMS format. The data stream from a Reference Receiver is used to provide GPS and ephemeris information to the test computer for comparison and processing of the JTU GPS data. The resulting JTU GPS and IMU data is displayed on the test computer's display screen and compared with the GPS and IMU test criteria established by the user. The user has the option of documenting the test by storing the results in a test summary text file (filename.txt).

The third test is an acceptance test of both the GPS and IMU components of the JTU. This test is comprised of seven parts. The first part is the successful completion of a Functional Test. The remaining six parts, one for each of the three accelerometers and one for each of the three rate sensors, is a detailed evaluation of the IMU biases. The measured biases are displayed and compared with test criteria established by the user. The data streams from the Reference Receiver and the JTU under test are saved to individual files (filename.ref and filename.jtu respectively) for each part of the test for later playback and analysis by the user. The user has the option of documenting this test by storing the results, as well as a list of all the files that were generated during the test, to a text file (filename.txt).

The fourth test is a qualification test of both the IMU and GPS components of the JTU. This test is comprised of two parts. The first part is the successful completion of a Functional Test. The remaining part of the test consists of an evaluation of both the IMU and GPS components over a specified time period and under a variety of environmental conditions. The data streams from the Reference Receiver and the JTU under test are saved to individual files (filename.ref and filename.jtu respectively) for later playback and analysis. A summary text file (filename.txt) is generated documenting the overall results of the test.

DETAILED DESCRIPTION OF THE PREFERRED EMBODIMENTS

Figure 1:
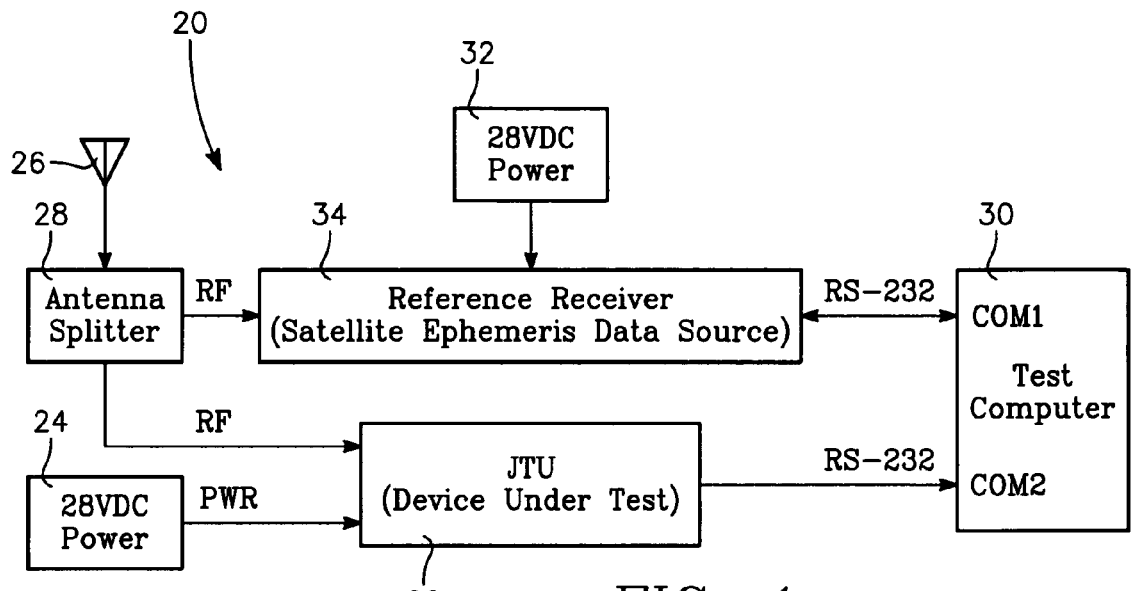
FIG. 1 is an RS-232 test set configuration for testing a JTU Device using a test computer and the software comprising the present invention.
Figure 2:
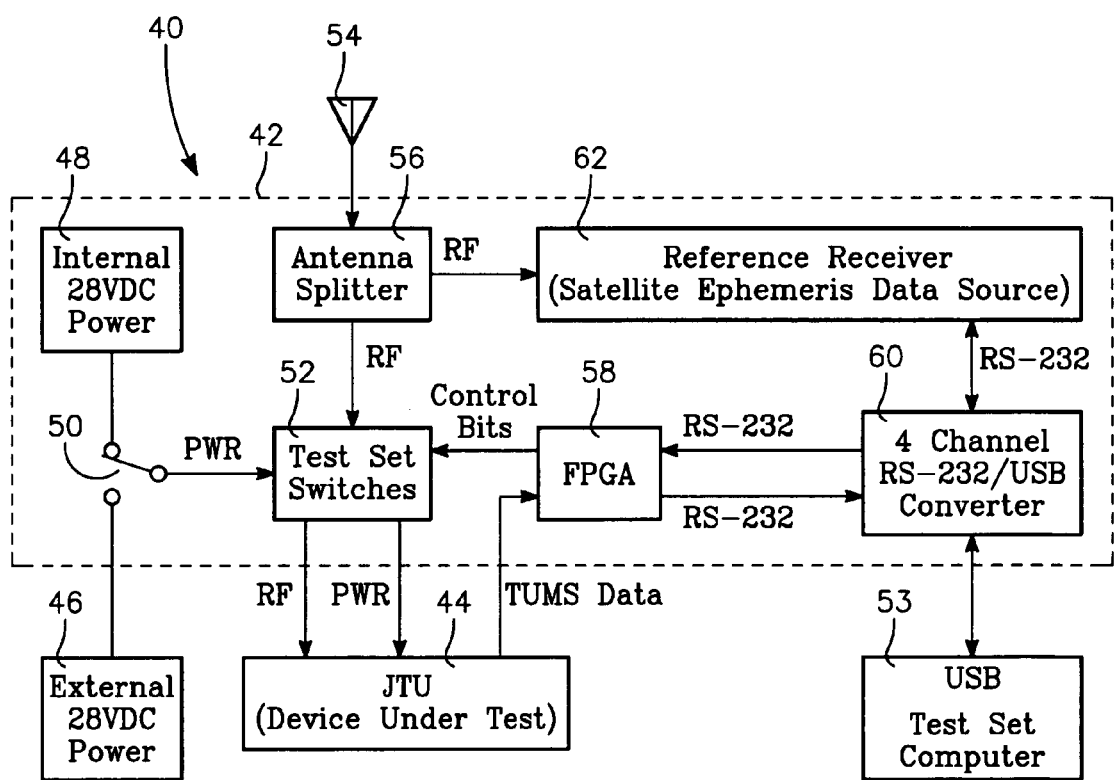
FIG. 2 is a USB test set configuration for testing a JTU Device using a test computer and the software comprising the present invention.

Referring first to FIGS. 1 and 2, the hardware configurations 20 and 40 required to test JTUs 22 and 44 and the configuration of the software depend upon the test being performed and the circumstances or category of the test. The four tests can be grouped under two test categories. These are the "Field Test" and the "Bench Test" categories. Tests falling under the "Field Test" category are the test requiring minimal support equipment and include a "JTU IMU Test" and a "Functional Test". The two field tests can be performed just prior to a mission with as little as a properly configured test computer. Tests falling under the "Bench Test" category are the tests performed in the laboratory environment or at a manufacturing facility utilizing a test set in addition to test computer 30 or test computer 53. These tests include the Acceptance Test and the Qualification Test but can include all four of the tests.

To field test the JTU 22 (FIG. 1), the user connects the JTU 22 to a +28 VDC power supply 24, which is the power source for JTU 22, an antenna splitter 28, and GPS antenna 26. GPS antenna 26 receives RF (radio frequency) signals which include GPS data from satellites orbiting the earth. The RF signals are then split by antenna splitter and supplied to reference receiver 34 and JTU 22.

The user also connects the RS-232 output of JTU 22 to one of the RS-232 ports (COM2 port) of the test computer 30. When the GPS sensor of JTU 22 is to be tested, a Reference Receiver is connected to a second RS-232 port on the test computer 30.

Variations to the test setup of FIG. 1 include the JTU host platform providing power and GPS antenna 26 connections to the JTU 22 and also include incorporating the Reference Receiver 34, its power supply 32 and its GPS antenna into the test computer 30. Power supply 32 provides 28 VDC to reference receiver 34.

Referring to FIG. 2, to bench test the JTU 22 (FIG. 2), the user connects the JTU 44 to the test set 42 and then connects the test set 42 to a GPS antenna 54 and to one of the USB ports of test computer 53. A 28 VDC external power supply 46 may also be connected to the test set 42 which has an internal 28 VDC external power supply 48. A power switch 50 allows the user to select either power supply 46 or 48 to supply power to the test set 42.

The computer software (FIGS. 3–12), which is used in either test computer 30 or test computer 53, requires a minimum 750 MHz Pentium Computer running the Windows 2000 operating system. If a laptop computer is used as test computer 30 or 53, the user must ensure that there are no processes running that might interrupt any of the communications. Any significant interruption will cause errors in the measured values resulting in a failed test. Severe repetitive communications dropouts may result in an automatic restart of the test that could be repeated indefinitely. To avoid these problems the user needs to configured the test computer 30 or 53 for desktop operation.

The Field Test configuration 20 requires that the test computer 30 must have at least two RS-232 serial communications ports. The first port is to be connected to the JTU 22 being tested and must be capable of communicating at 230.4K baud which is a requirement of the JTU-II. The second port is only needed to test the GPS Section/Sensor JTU 22. The COM1 port of test computer 30 is connected to the Reference Receiver 34 and should be capable of communicating at 115.2K baud which is the maximum Reference Receiver baud rate. The Reference Receiver 34 and its power supply 32 may be mounted internal to the test computer 30 for simplified field use.

Reference receiver 34 provides satellite ephemeris data and location data for the reference receiver to test computer 30. Ephemeris data is data which contains information as to satellites which are in the field of view of the reference receiver 34, orbital information about the satellites, satellite timing data and other data which is used to compute location. The data from reference receiver 34 describes accurate orbital information for the satellites. The data from the JTU 22 is measured with respect to the JTU's current location. GPS Location data from reference receiver 34 and JTU 22 is processed by test computer 30 which provides a current and exact location for JTU 22. The location for JTU 22 is expressed as the latitude, longitude and altitude for JTU 22.

JTU 22 also has three accelerometers and three rate sensors which provide inertial navigation information which supplements the GPS data from the JTU 22 when satellites fail to provide GPS data to JTU 22. Occasionally satellite RF signals are not able to be received by the JTU 22, resulting in a loss of GPS data to the JTU 22. The accelerometers and rate sensor are capable of providing the information needed to extrapolate a location for JTU 22 when satellite GPS data is not being provided to JTU 22.

The Bench Test configuration 40 for testing the JTU 44 with test set 42 requires computer 53 to have a USB port. It is through this port that all communications with the test set, the Reference Receiver and the JTU under test takes place.

The test set 42 operates from a standard 115 VAC power source. Test set 42 has connections on a front panel for the external power supply 46, a USB cable which connects 4 Channel RS-232/USB Converter 60 to test computer 53, an SMA connector which connect antenna splitter 56 to GPS antenna 54, an SMA connector which connects to the GPS RF input of JTU 44 to test set switches 52, and an MDM-51 connector to provide power to and receive data from the JTU 44 being tested. Test set 42 also has indicators for power on, Built In Test (BIT) status and Reference Receiver status as well as a voltmeter and an amp meter display to provide an indication of the power used by the JTU 44.

A field programmable gate array 58 is also connected to test set switches 52 and JTU 44. The field programmable gate array 60 functions as a routing device routing data over an RS-232 bus to 4 Channel RS-232/USB converter 60. Field Programmable Gate Array 58 generates control bits which are supplied to test set switches 52. In response to these control bits, switches 52 provide a switch capability to switch on the RF signal and the power signal supplied to JTU 44. Switching of the power signal to JTU is required for the qualification test of the JTU and functional testing of the JTU 22. When the JTU 22 is first turned on a time period of approximately 20 seconds is provided for the JTU to power up to an operational state. When this time period expires the JTU must have the capability to acquire RF signals which include GPS data. The control bits are used to test the JTU to insure it meets this operational requirement. Test Set Computer 53 initializes the test by supplying control information/test signals via converter 60 to the field programmable gate array 58. The test set switches 52 are then set to the desired position.

It should be noted that test set computer 53 is a Windows compatible computer which includes a key board, a mouse and a visual display device for the user. Further, it should be noted that the hardware configuration 40 allows the user to perform a complete qualification test on JTU 22, while the hardware configuration 20 has limited testing capabilities.

The Field Programmable Gate Array 58 also has the capability of selecting anyone of three outputs from JTU 44. The three outputs provided by JTU 22 comprise: (1) eight bit parallel data; (2) RS-232 data; and (3) serial binary data. Each of the three output data streams from JTU 44 contain data in a TUMS format. Eight bit parallel data from JTU 44 is converted to RS-232 data by Field Programmable Gate Array 58. The RS-232 data from JTU 22 passes through Field Programmable Gate Array 58 to the converter 60. Test Set Computer 53 sends a code to Field Programmable Gate Array 58 which indicates to Gate Array 58 the type of data stream Gate Array 58 is to receive from JTU 22. Test Set Switches 52 includes an RF switch and power switch.

There are three critical test parameters that differ between the two JTU types. A set of these three parameters is registered when the JTU Type is selected at the beginning of the test. These parameters and their default values are listed in the following table.

TABLE I

| Parameter | JTU-I Set | JTU-II Set |
|---|---|---|
| Communications Baud Rate | 115,200 Baud | 230,400 Baud |
| IMU Sample Rate | 40 Samples/Sec. | 125 Samples/Sec. |
| Satellite Acquisition Time | 90 Seconds Maximum | 15 Seconds Maximum |

There are four files that make up the computer software used in test computer 30 and test set computer 53. These are the program executable file (JTU_Test.exe), the initialization file (JTU_Test.ini) and two library files (MFC42D.DLL and MSVCRTD.DLL).

The program executable file can be located in any directory or folder. This file contains the Graphical User's Interface (GUI) and the communications, measurement and control software. This program was developed with a Visual C++ compiler utilizing Foundation Classes on a Windows 2000 operating system. The computer software program was designed for the Windows 2000 operating systems and may not be compatible with other operating systems.

The Initialization file is an ASCII text file that the user can edit. The Initialization file contains initialization values for test criteria, communications, control and display. These initialization values are registered by the program executable at startup. Some of these registered values are changeable by the user during program execution through the Graphical User's Interface. The initialization file must be located in the same directory or folder as the program executable file. If the initialization file is not located where expected a message will be displayed and a set of default values will be used. Table II–IX, grouped by category, contain a description of each of these values.

The library files were developed for the Microsoft Visual C++ Compiler available from Microsoft Corporation utilizing Foundation Classes when releasing software in the debug version. The software requires that the two library files (MFC42D.DLL and MSVCRTD.DLL) reside in the active system folder. Both files support the debug version of Windows applications. MFC42D.DLL is needed to support the debug version of software utilizing Microsoft Foundation Classes.

TABLE II

| [ANTENNA_LOCATION] | Default Value | Description |
|---|---|---|
| Latitude | +34.1111 | Geodetic Latitude in Degrees |
| Longitude | −119.1106 | Geodetic Longitude in Degrees |
| Altitude | +10.000 | Geodetic Altitude above MSL in Meters |

TABLE III

| [TEST_BOX] | Default Value | Description |
|---|---|---|
| COM_Port | COM3 | Computer's Logical Serial Communications Port |
| COM_Setup | 115200, N, 8, 1 | Baud Rate, No Parity, 8-bit Words, 1 Stop Bit |
| TestDataSource | 0 | Default Selection of the Test Data Source. 0 = JTU Serial TUMS RS-232 Output 1 = JTU Serial TUMS PCM Output 2 = JTU Parallel Block TUMS Data Output 3 = JTU Parallel Free Running TUMS Data Output 4 = External Decommutator Output |
| UserCtrlEnable | 1 | Provides a GUI for User Control of the Test Set 0 = Disabled (GUI not displayed) 1 = Enabled (GUI displayed when inputs allowed) |

TABLE IV

| [REF_RCVR] | Default Value | Description |
|---|---|---|
| COM_Port | COM1 | Computer's Logical Serial Communications Port |
| COM_Setup | 115200, N, 8, 1 | Baud Rate, No Parity, 8-bit Words, 1 Stop Bit |
| InitialBaud Rate | 0 | First Baud Rate Used to Establish Communications. 0 = 300 Baud 1 = 600 Baud 2 = 1,200 Baud |

TABLE IV-continued

| [REF_RCVR] | Default Value | Description |
|---|---|---|
| | | 3 = 2,400 Baud |
| | | 4 = 4,800 Baud |
| | | 5 = 9,600 Baud |
| | | 6 = 19,200 Baud |
| | | 7 = 38,400 Baud |
| | | 8 = 57,600 Baud |
| | | 9 = 115,200 Baud |
| | | 10 = 128,000 Baud |
| | | 11 = 256,000 Baud |
| FinalBaudRate | 9 | Final Communications Baud Rate (see above values). |
| MaxResponse Time | 1000 | Time Allowed for Receiver to Respond (milliseconds). |
| MinSats | 4 | Minimum Number of Satellites Required for Location. |
| MaxAcqTime | 60 | Time Allowed to Acquire MinSats Satellites (seconds). |

TABLE V

| [JTU_RCVR] | Default Value | Description |
|---|---|---|
| COM_Port | COM2 | Computer's Logical Serial Communications Port |
| JTU1_COM_Setup | 115200, N, 8, 1 | Baud Rate, No Parity, 8-bit Words, 1 Stop Bit |
| JTU2_COM_Setup | 230400, N, 8, 1 | Baud Rate, No Parity, 8-bit Words, 1 Stop Bit |
| PowerOnWarm UpTime | 20 | Delay After JTU Power On Prior to Test (seconds). Antenna connection delay following power on. 0 = No delay. Power applied upon program start. Remains on unless commanded off. Power reapplied upon program exit. >0 = Power applied at start of Functional Test. Remains on unless commanded off. Power off upon program start, restart and exit. |

TABLE VI

| [JTU_IMU_ CRITERIA] | Default Value | Description |
|---|---|---|
| IMU_Bias TestTime | 20 | Time Taken to Test IMU Biases (seconds). |
| AccelBias RangeX | 1.000 | Default Range is from −1.000 to +1.000 m/s/s |
| AccelBias RangeY | 11.000; 8.000 | Default Range is from +8.000 to +11.000 m/s/s |
| AccelBias RangeZ | 1.000 | Default Range is from −1.000 to +1.000 m/s/s |
| RateSensorX | 0.05 | Default Range is from −0.05 to +0.05 deg/s/s |
| JTU1_Samples PerSecond | 40 | IMU Data Rate for JTU-1 (samples per second) |
| JTU2_Samples PerSecond | 125 | IMU Data Rate for JTU-II (samples per second) |

TABLE VII

| [JTU_GPS_ CRITERIA] | Default Value | Description |
|---|---|---|
| MinSats | 4 | Minimum Number of Satellites Required for Test. |
| JTU1_MaxAcq Time | 90 | Time Allowed for JTU-I to Acquire MinSats Satellites (seconds). |
| JTU2_MaxAcq Time | 15 | Time Allowed for JTU-II to Acquire MinSats Satellites (seconds). |
| Epochs Discarded | 10 | Number of GPS Epochs Used to Settle the Filter. |
| Epochs Required | 100 | Number of GPS Epochs Used for the Test. Excludes Epochs Discarded. |
| MaxLockTime Resets | 50 | Lock Time Resets Allowed each Satellite in Test. |
| EpochsPer Second | 10 | GPS Message Rate (Data Samples Per Second). |

TABLE VIII

| [JTU_REF_ COMPARISON] | Default Value | Description |
|---|---|---|
| MaxDelta | 8.0 | Maximum Position Difference between Position Receivers (meters). |
| MaxDelta MeanCNO | 2.0 | Maximum Allowed Delta Mean CNO (db-Hz). |
| MaxDelta TimeError | 0.1 | Maximum Allowed Time Difference between JTU and Reference Receivers (seconds). |
| MaxDeltaSats | 4 | Maximum Allowed Difference in Satellites Acquired by JTU and Reference Receivers. |

TABLE IX

| [DISPLAY] | Default Value | Description |
|---|---|---|
| Engineering View | 0 | Displays Additional GPS Receiver Data. 0 = Not Displayed 1 = Displayed |

Figure 4:
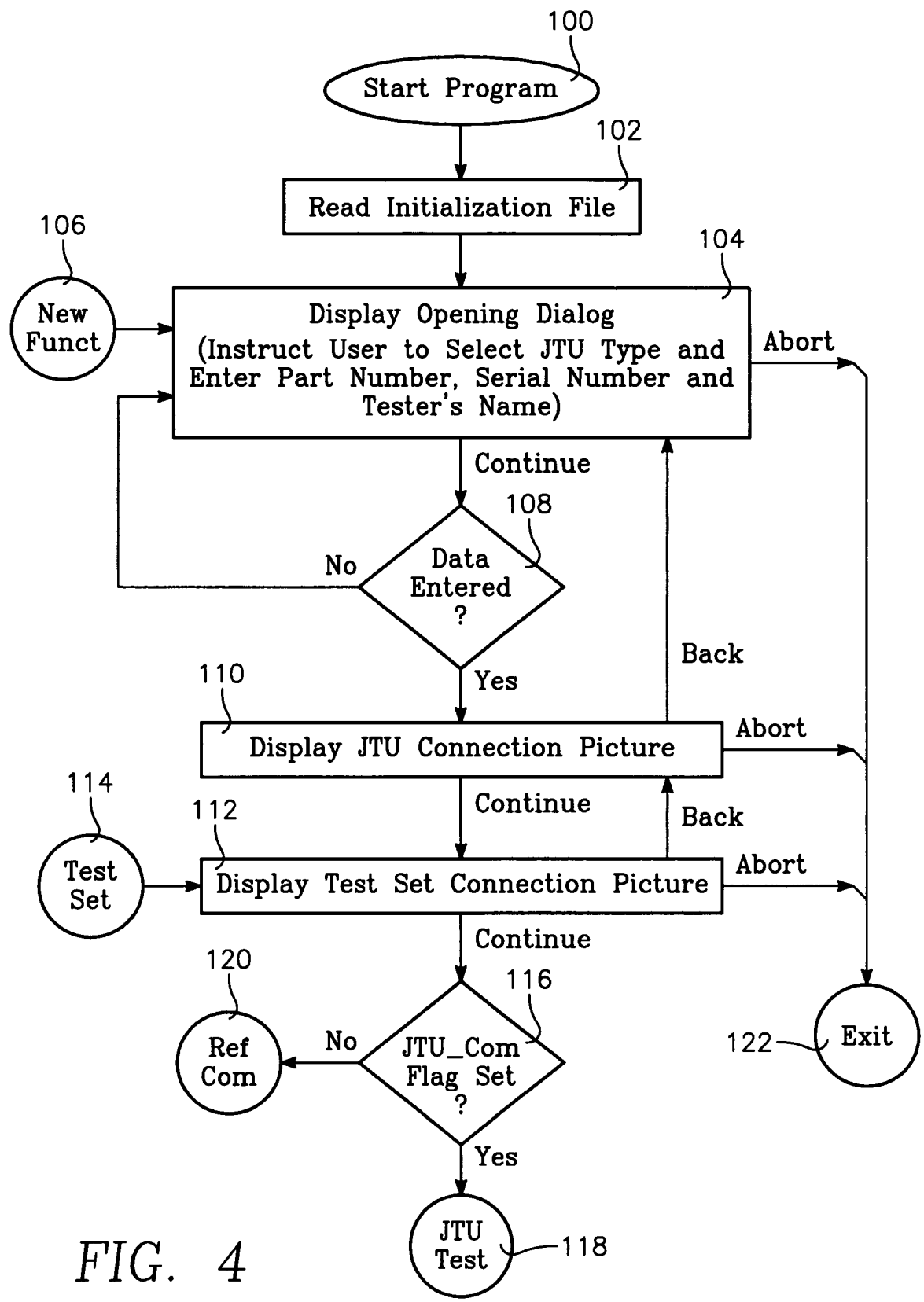
FIG. 4 is a flow diagram for the opening dialogs routine within the computer software program of FIG. 3.
Figure 5:
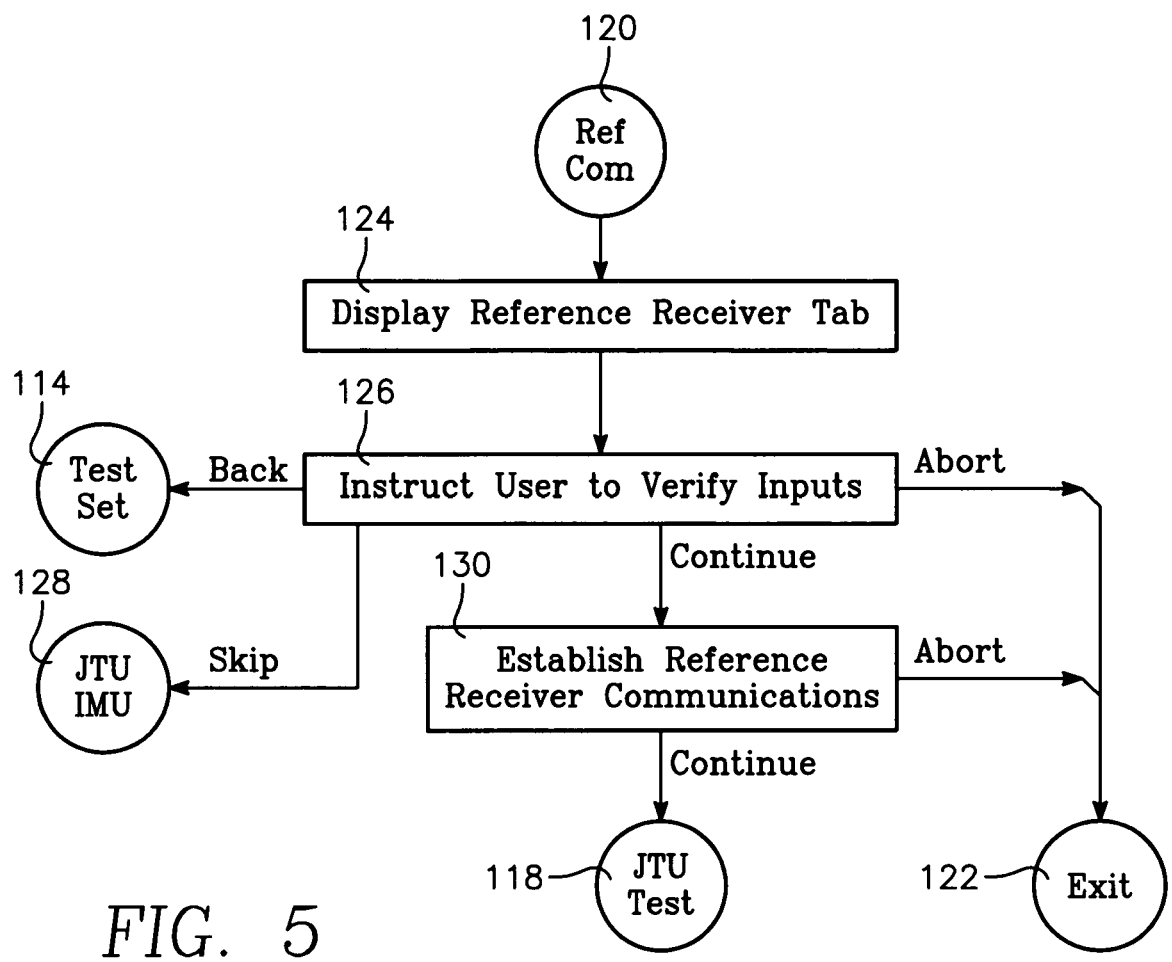
FIG. 5 is a flow diagram for the reference receiver dialog routine within the computer software program of FIG. 3.
Figure 12:
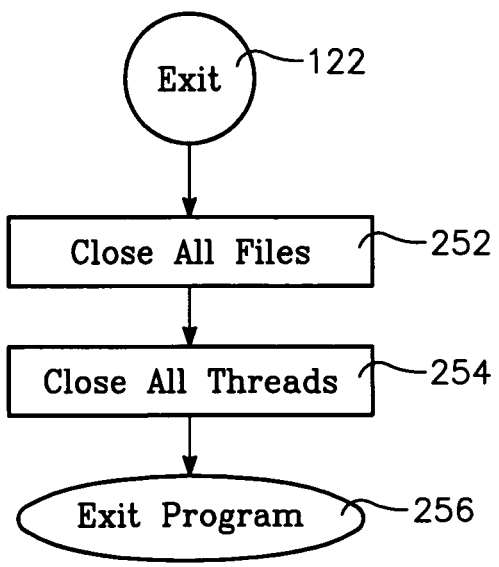
FIG. 12 is a flow diagram for the Exit Program routine within the computer software program of FIG. 3.

Referring to FIGS. 1, 2 and 4, following the start of the program (program step 100), program step 102 reads the initialization files set forth in Tables II–Tables IX. The computer software proceeds to program step 104 which comprises an initial opening dialog with the user of the software. The user is required to select a JTU type and input of the JTU part number, serial number and the user's name (the person performing the test) or a user ID. The user is instructed to click a "Continue" button at a user console once this data is entered (program step 108). Only after this data is entered will the user be allowed to advance to the next dialog. The user may also click an "Abort" button to abort or exit the program (program step 122, FIG. 12). FIG. 12 also includes program step 252 which closes all files and program step 254 which closes all threads prior to exiting the program (program step 256).

It should be noted that the software can enter the initial opening dialog via the new function program step 106.

During program step 110, the software presents the next dialog to the user which is the JTU Connection dialog. This dialog shows a picture to the user of the cabling connected to the JTU for proper operation and testing. The user is instructed to click the "Continue" button when these connections have been made. The user is also given the option to click a "Back" button to permit the user to go back to the previous dialog and make any necessary changes to the entries or to click the "Abort" button to abort or exit the program.

During program step 112, the software presents the next dialog to the user which is the Test Set Connection dialog. This dialog shows a picture of the cabling connected to the Test Set. The user is instructed to click the "Continue" button when these connections have been made and the setting on the power supply has been verified. Once again the user is given the opportunity to click the "Back" button to review the previous dialog or to click the "Abort" button to abort the program.

Referring to FIGS. 1, 2, 4 and 5, the "Continue" button takes the user to the Reference Receiver dialog to establish communications with the Reference Receiver 34 (FIG. 1) or 62 (FIG. 2) (Program steps 116 and 120). If communications has already been established during a previous test the "Continue" button will take the user to the JTU Receiver dialog (program step 118). This avoids unnecessarily reestablishing this communications and the resulting time required to receive a new set of ephemeris data.

From the Reference Receiver dialog (program step 120), the user is presented with several choices via the display reference receiver tab (program step 124). The user is next ask to verify inputs (program step 126,). The user may then click the "Continue" button to establish communications with the Reference Receiver (program step 130), which is the default choice for the user. An alternate choice is to click the "Skip" button, which will take the user through program step 126 to the JTU IMU Test (program step 128). The JTU IMU Test does not require ephemeris data from the Reference Receiver and therefore does not need to establish communications with the reference receiver. At this point the user also has the options of clicking the "Back" button (program step 114) to review any of the previous dialogs or clicking the "Abort" button to exit the program (program step 122).

Prior to clicking the "Continue" button to establish communications with the Reference Receiver 34 (FIG. 2) or 62 (FIG. 2), the user must verify that the location indicated in the edit boxes for antenna 26 (FIG. 1) or antenna 54 (FIG. 2) is correct (program step 124). If it is not correct the Reference Receiver 34 or 62 may never compute an accurate location for the antenna 26 or 54. A surveyed location is necessary to properly evaluate the GPS Sensor component within the JTU 22 or 44 under test. The user also has the option of setting the required minimum number of satellites tracked. The minimum number allowed to locate an object in space is four. The greater the number of satellites being tracked the greater the accuracy of the computed location for the antenna.

Figure 3:
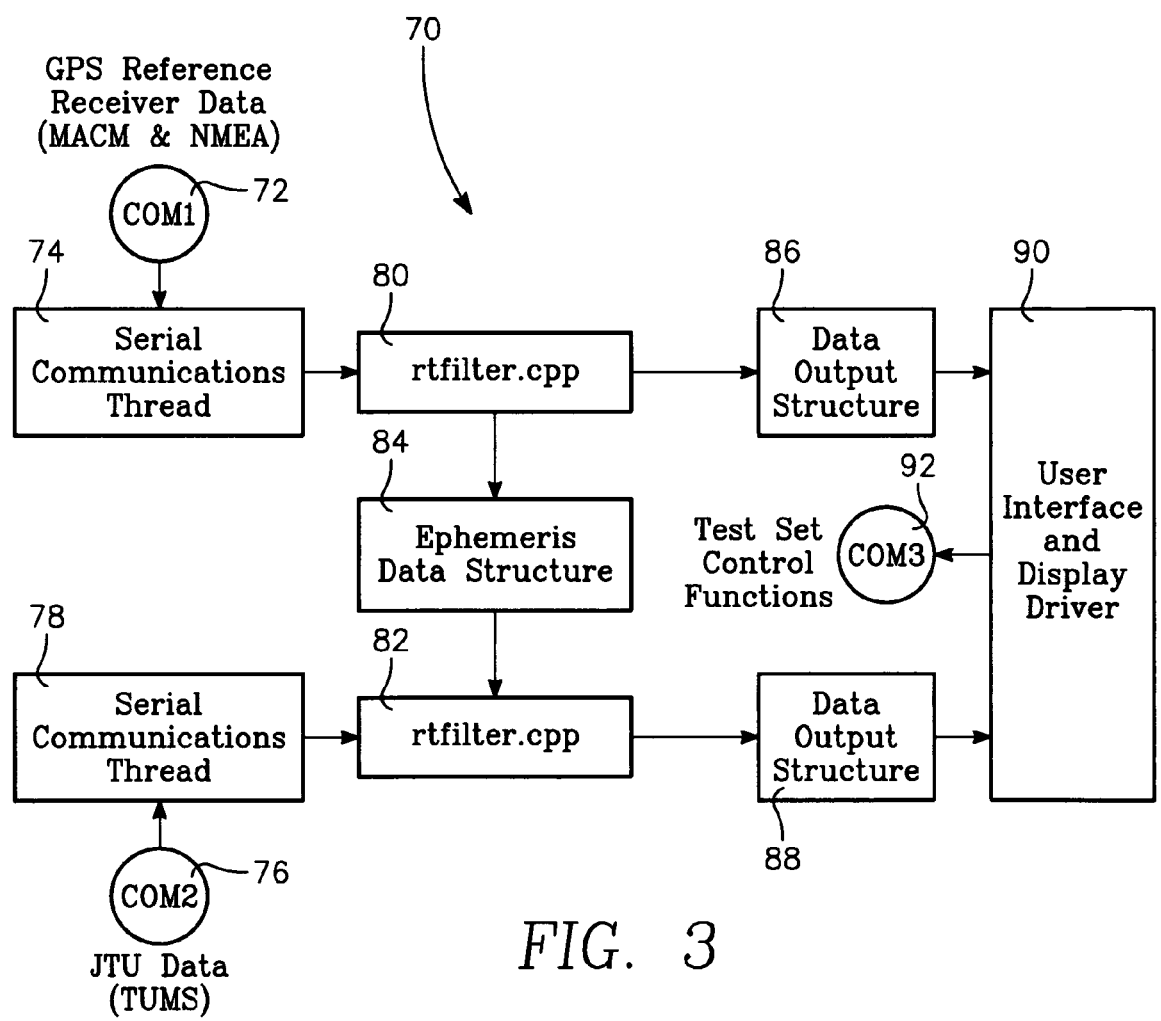
FIG. 3 is a communications flow diagram for the computer software program comprising the present invention.

Referring to FIGS. 1, 2 and 3, FIG. 3 illustrates the Communications flow diagram 70 for the computer software. Two message formats are used to transfer data from the Reference Receiver 34 or 62 via COM1 (program step 72) to the computer software program. The Reference Receiver GPS data is transferred using the Missile Application Condensed Measurement (MACM) format. The ephemeris data (program step 84) is transferred using the National Marine Electronics Association (NMEA) SNV message format. All data received from the Reference Receiver, as well as the JTU via COM2 (program step 76), is sent to a software filter (program steps 80 and 82) for parsing and processing to determine the location of the antenna.

The COM1 port 72 receives data from the reference receiver 34 which is then supplied to a Serial Communications Thread 74. Serial Communications Thread 74 is a background routine which runs real time independent of the GUI. Thread 74 supplies data to RT filter 80 which splits the ephemeris data and the remaining GPS data. The ephemeris data is placed in an ephemeris data structure 84 and the remaining GPS data is placed in a data output structure 86. The data from data output structure 86 is available to the User Interface and Display Driver 90.

The COM2 port 76 receives TUMS data from the JTU 22. The data is received by a Serial Communications Thread 78 and then supplied to an RT filter 82. Filter 82 also acquire ephemeris data from structure 84. GPS output data is generated and supplied to data output structure 88. The data is available to the user Interface and Display Driver 90. The COM3 port 92 connects to Test Set Computer 53 to provide control information to test set 42 and the Field Programmable Gate Array 88.

After the user clicks the "Continue" button, a communications thread is established with the Reference Receiver in accordance with the initialization values in the JTU_Test.ini file. Prior to detecting any of the data formats, edit boxes under a TSPI Status group will display three dashes. Once a complete frame of data is detected, a Message Counts group and MACM Sats and Sats Used boxes will actively display data. The MACM Sats box shows the number of satellites tracked in the MACM message. The Sats Used box shows the number of satellites used in computing antenna location. When a minimum number of three satellites are used a GPS Time box will display active data. When four or more satellites are used the remaining edit boxes (Latitude, Longitude and Altitude edit boxes) will actively display data. While the program is waiting for the filter (program steps 80 and 82) to detect and use a minimum of four satellites, a timer bar is displayed to show the user that the program is working. If a minimum number of four satellites are not used by the time the timer bar expires the user has the options of allowing some additional time or clicking the "Continue" button to proceed with the Functional Test or clicking the "Abort" button to exit the program. The Functional Test will fail if a minimum of four satellites are not in use by the end of the JTU warm-up and acquisition time.

Figure 6:
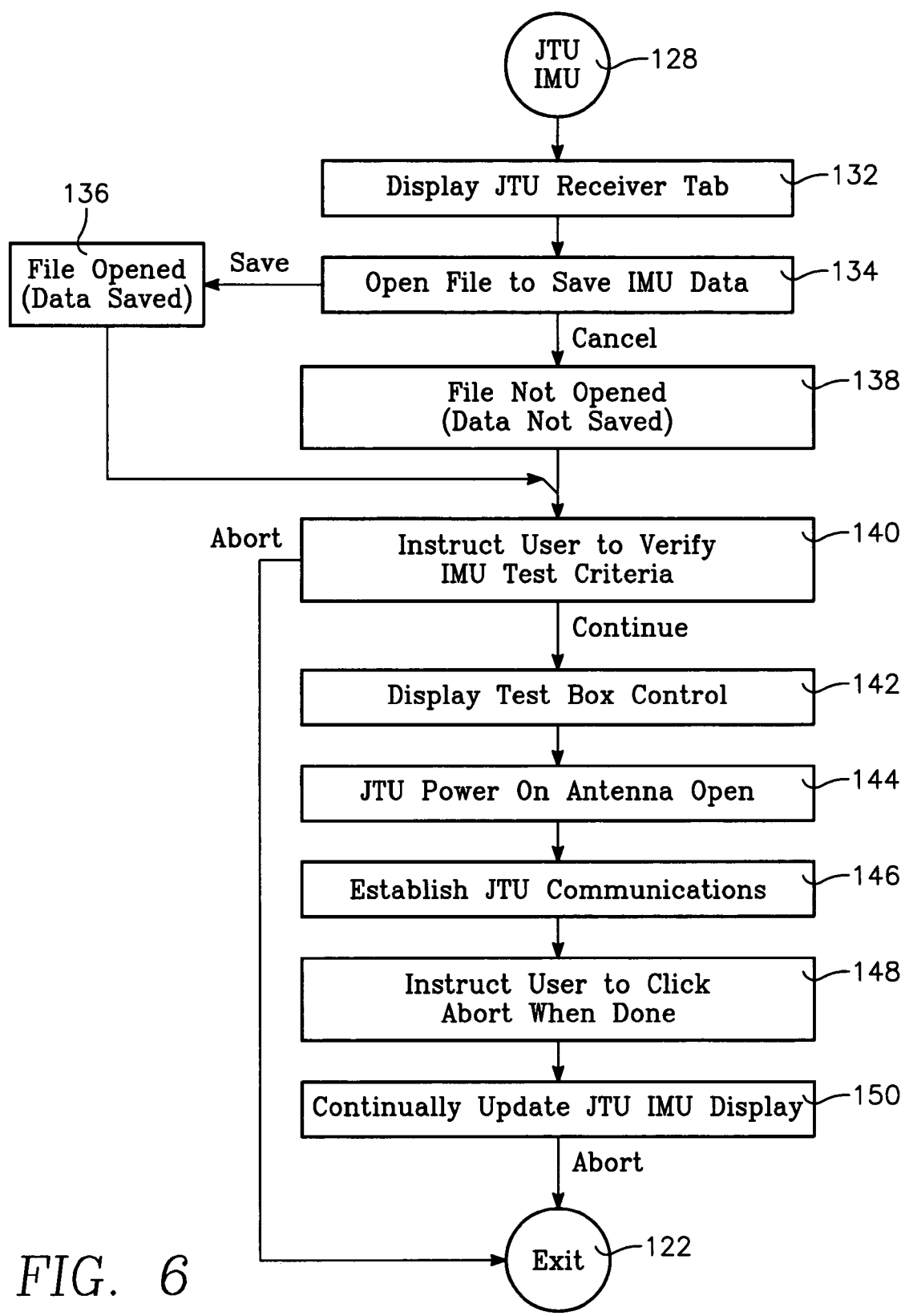
FIG. 6 is a flow diagram for the JTU IMU Test routine within the computer software program of FIG. 3.

Referring to FIGS. 1, 2, and 6, the user utilizes the JTU IMU test (program step 128) to verify the operation of the IMU component of the JTU. Accordingly, only the IMU information contained in the JTU TUMS formatted data stream is used. None of the GPS information, which requires communications with the Reference Receiver to obtain satellite ephemeris data, is used.

Upon entering this test the Save TUMS IMU Data dialog is displayed (program step 132) and the user is given the option of establishing a file in which to save the JTU TUMS data source (program steps 134 and 136). The user also may elect not to create a file (program step 138).

Following this, if the Test Box user control is enabled, the Test Box Control dialog will be displayed (program step 142) giving the user the opportunity to select the source of the TUMS data. The user must also verify the test criteria shown under the JTU Receiver tab (program step 140) prior to clicking the "Continue" button to start the test. Upon clicking the "Continue" button communications is established with the JTU (program step 146) and the data is displayed in real-time.

The JTU Power control in the Test Box Control dialog is also enabled providing the user with the capability of turning the power off and then on again and of changing the source of the TUMS data (program step 144). Throughout this process the user has the option of clicking the "Abort" button to exit the program (program step 148). The test criteria for each parameter is displayed and entered as a pair of values separated by a semicolon. If only one value appears the range is taken as symmetrical about zero.

The IMU data is calculated and displayed each time a new TUMS message is received (program step 150). The real time Deltas are used to calculate the Accumulated Deltas, the Biases, and the Windowed Noise (maximum peak to peak difference occurring each second). The Calculated Bias display will change from black over gray to red over yellow when a test criterion is exceeded.

Figure 7:
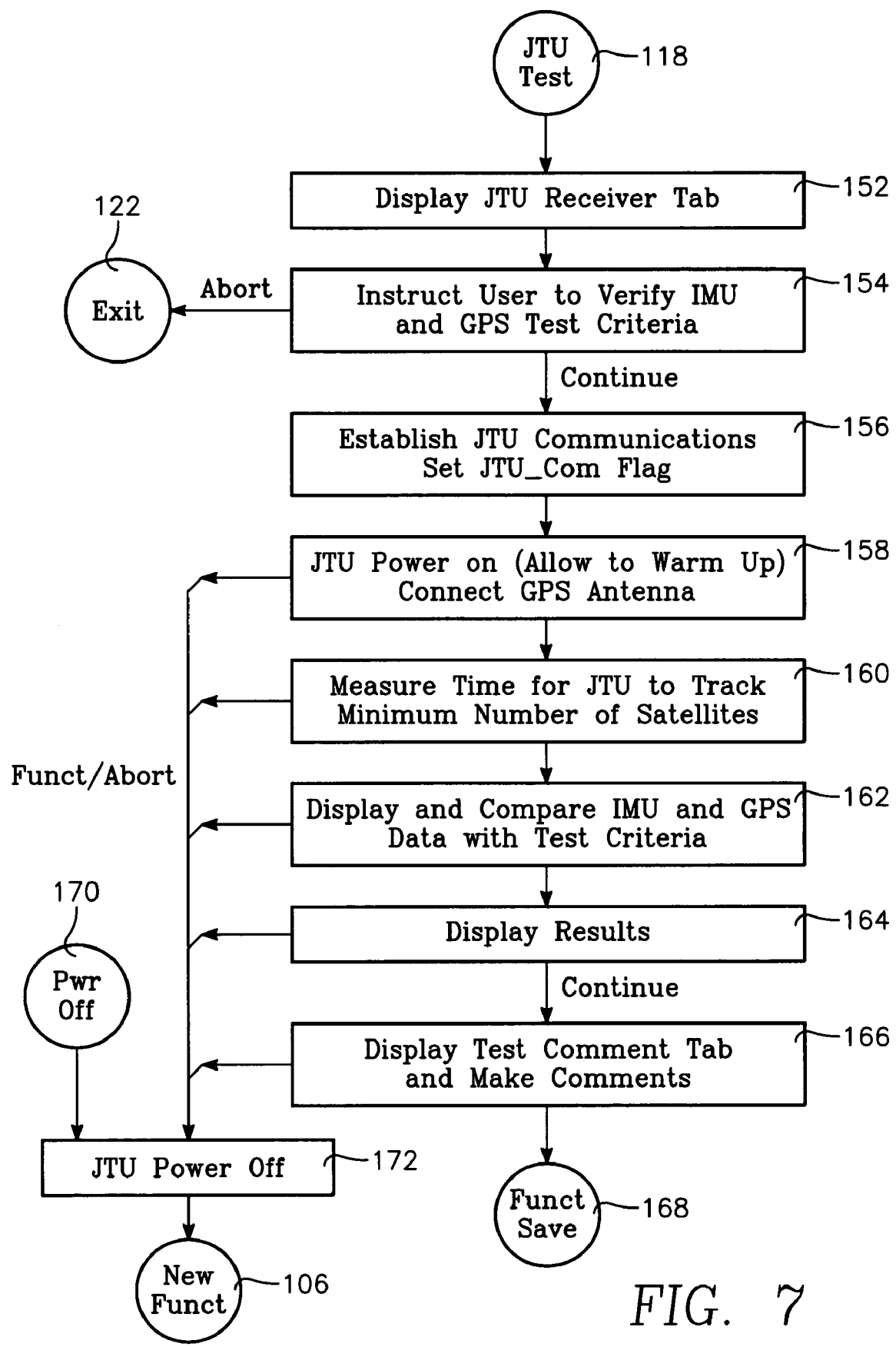
FIG. 7 is a flow diagram for the JTU Functional Test routine within the computer software program of FIG. 3.

Referring to FIGS. 1, 2 and 7, the user uses the JTU Functional Test to verify the operation and performance of the IMU and GPS Sensor components of the JTU (program step 118). Prior to starting this test communications must be established with the Reference Receiver 34 or 62 and satellite ephemeris data, for a minimum of four satellites, should be received and registered. Initially the JTU Receiver tab and the Test Box Control are displayed (program step 152). The user is requested to verify the test criteria for both the IMU and GPS Sensor components of the JTU 22 or 44 device under test and the Test Box settings (program step 154).

After completing the verification required by program step 154, the user begins the JTU test by clicking the "Continue" button. The active edit boxes are then disabled and the Test Box Control is removed until the user has been given the option of documenting the results of the test. Communications with the JTU is then established and the data is displayed in real-time (program step 156). A JTU_Com Flag is also set during program step 156. During program step 158, JTU power is turned on and the JTU is allowed to warm up. Program step 160 measures the time required for the JTU to track the minimum number of satellites which is four satellites. Program step 162 displays IMU and GPS data with the GPS and IMU test criteria established by the user.

The user is kept informed of the progress of each phase of the test via a progress bar. When the test is completed the display updates are suspended and a summary of the results are displayed above the tabs (program step 164).

The test criteria for each parameter of the IMU component is displayed and entered as a pair of values separated by a semicolon. If only one value appears or is entered the range is taken as symmetrical about zero.

The test criteria for the GPS Sensor component is composed of Epochs Discarded, Epochs Required, Maximum Delta Position (Max dP), Max Mean, and Max Resets.

The Epochs Discarded refer to the initial number of TUMS messages that are passed through the filter (rtfilter-.cpp 80 and 82 shown in the Communications Flow Diagram 70 of FIG. 3), but not used in the data calculations. Running a few messages through the filter before the calculations begin provides the filter a little time to stabilize its output and reduce any computational transients.

The Epochs Required refers to the minimum number of TUMS messages required to perform the test. The data from these messages are used to evaluate the JTU 22 or 44 under test.

Max dP is the maximum allowable difference between the computed JTU antenna location and that of the Reference Receiver antenna location. Since both receivers use the same antenna this difference should ideally be zero.

Max Mean is the maximum allowable difference (in dB) between the JTU GPS Sensor mean signal to noise ratio for each satellite compared to that of the Reference Receiver mean signal to noise ratio.

Max Resets are the maximum number of signal dropouts allowed for each satellite. When the signal from a satellite appears to drop out and return the data calculations for that particular satellite are cleared and restarted.

The IMU data is calculated and displayed each time a new TUMS message is received. The real-time Deltas are used to calculate the Accumulated Deltas, the biases, and the Windowed Noise (maximum peak to peak difference occurring each second). The Calculated Bias display will change from black over gray to red over yellow when a test criterion is exceeded.

Once the initial prescribed number of TUMS messages are discarded the GPS Sensor data display is updated each time a new message is received. During the Functional Test the time and location (latitude, longitude, and altitude) are the only GPS parameters typically displayed to the user. The user can enable the display of additional GPS parameters by editing the initialization file and changing the Engineering-view parameter in the Display group from a 0 to a 1.

If the "Abort" button is clicked before the Functional Test is started the program will terminate and the user will have to repeat the entire operation from the beginning for another test. Anytime during or after the test is started, clicking the "Abort" button will cause the program to return to the opening dialog to begin a new test. When the user clicks the "Abort" button, the JTU power is turned off (program step 172) and the software proceeds through the new function program step 106. As shown in FIG. 7, there is also a power off function (program step 170) which results in the software turning off power to the JTU 22 or 44 under test. The JTU type, part number and serial number will have to be entered again; however, the communications with the Reference Receiver 34 or 62 is maintained so the user does not have to wait to acquire another set of ephemeris data.

Following the display of the test results (program step 164), when the user clicks the "Continue" button the Test Comments tab is displayed and the user is requested to note the voltage and current and make any other appropriate comments (program step 166). Clicking the "Continue" button again results in the display of the Save Functional Test Data dialog in which the user is given the opportunity to document the results of the test (program step 168).

Figure 8:
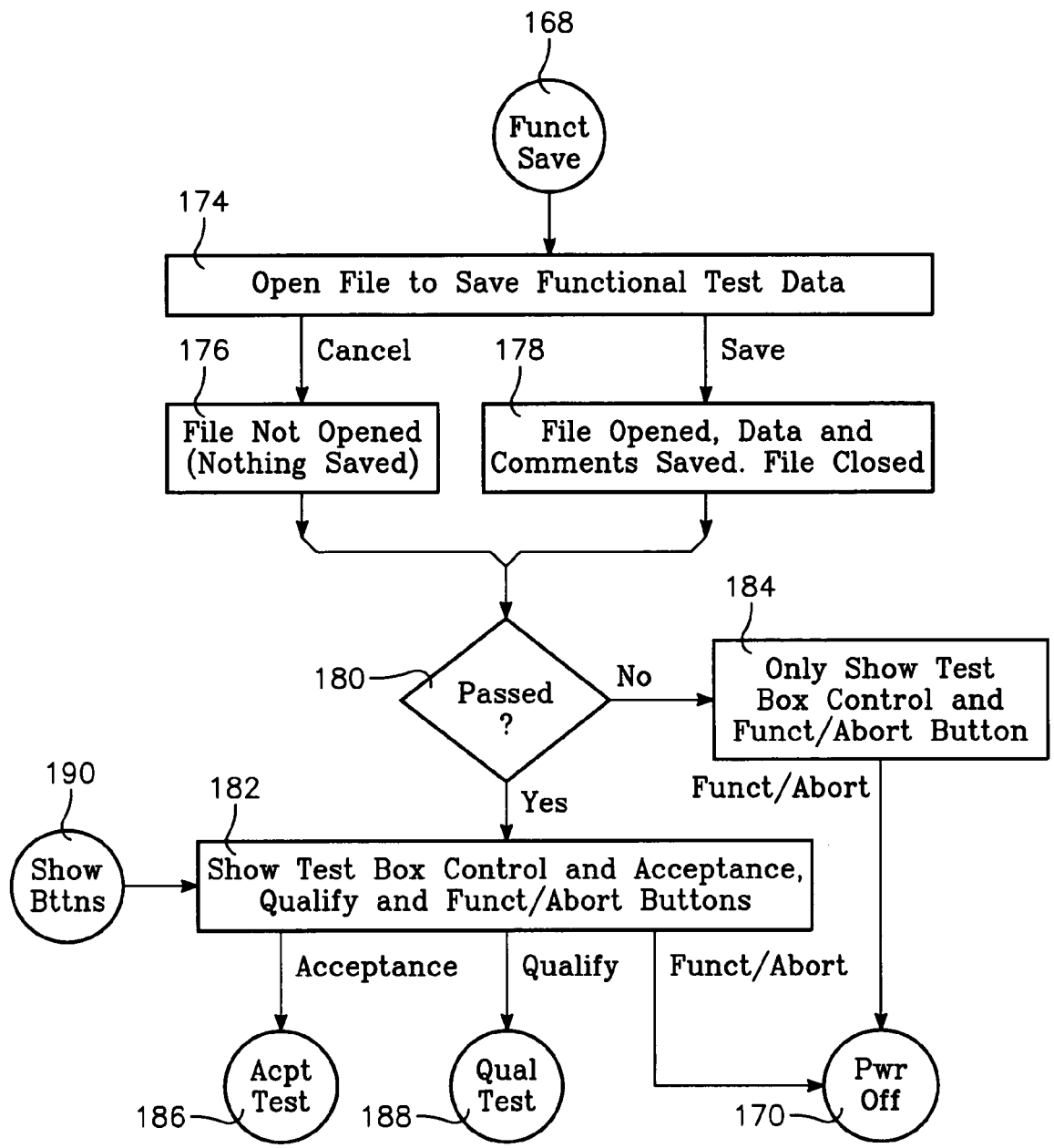
FIG. 8 is a flow diagram for the JTU Functional Test Save routine within the computer software program of FIG. 3.

Referring to FIG. 8, clicking the "Save" button (program step 174) allows the user to save a complete summary of the test results that includes any data and comments entered by the user (program step 178). When the user clicks the "Cancel" button, the test is not documented (program step 176).

After the JTU test of FIG. 7 is completed, the user has the ability to examine the contents of any of the tabbed dialogs. If the examination is performed prior to the presentation of the Save Functional Test Data dialog the data displayed will represent the results of the Functional Test. Following the presentation of the Save Functional Test Data dialog, the Test Box Control dialog will be displayed with all the controls enabled and the data on all of the tabbed dialogs will be active and show the current real-time operation of the JTU. This provides the user with the capability of disconnecting and connecting the antenna, turning the power off and then on again and selecting any of the JTU data outputs. This capability is most useful when troubleshooting a failed JTU.

Figure 9:
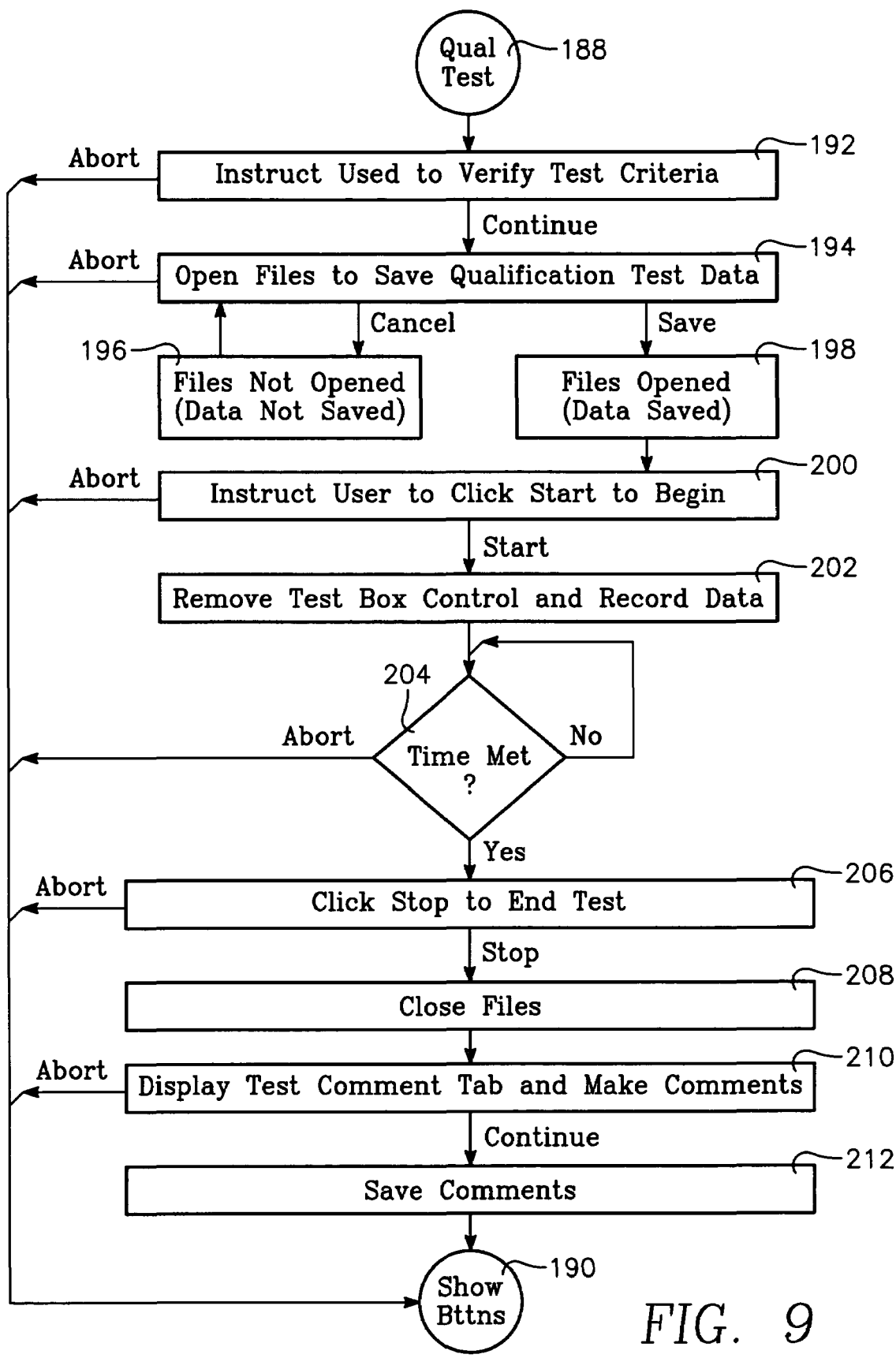
FIG. 9 is a flow diagram for JTU Qualification Test routine within the computer software program of FIG. 3.

Following the Functional Test the user is given the option of clicking one of three buttons. Clicking the "Acceptance" button will begin the dialog that will perform the remaining tests comprising the Acceptance Test (program steps 186 and 214) depicted in FIG. 10. Clicking the "Qualify" button will begin the dialog for a Qualification Test (program steps 188 and 192) which is depicted in FIG. 9. Lastly, Clicking the "Funct/Abort" button will remove power from the JTU (program steps 170 and 172) and take the user to the beginning of the program (Opening Dialogs illustrated in FIG. 4, Program step 104) with the option of performing another Functional Test or aborting/exiting the program.

Figure 10:
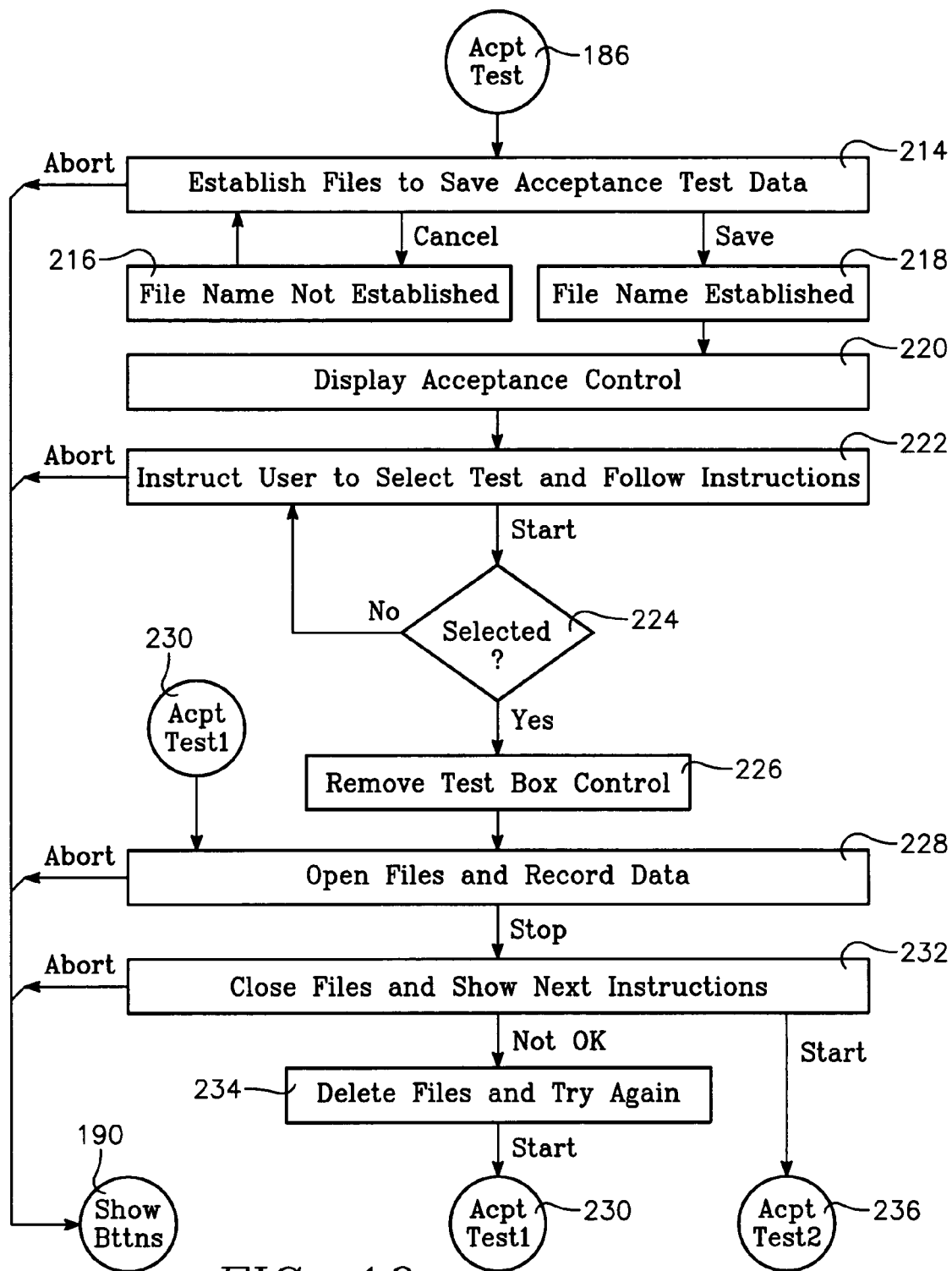
FIGS. 10 and 11 are flow diagrams for the Acceptance Test routines within the computer software program of FIG. 3.
Figure 11:
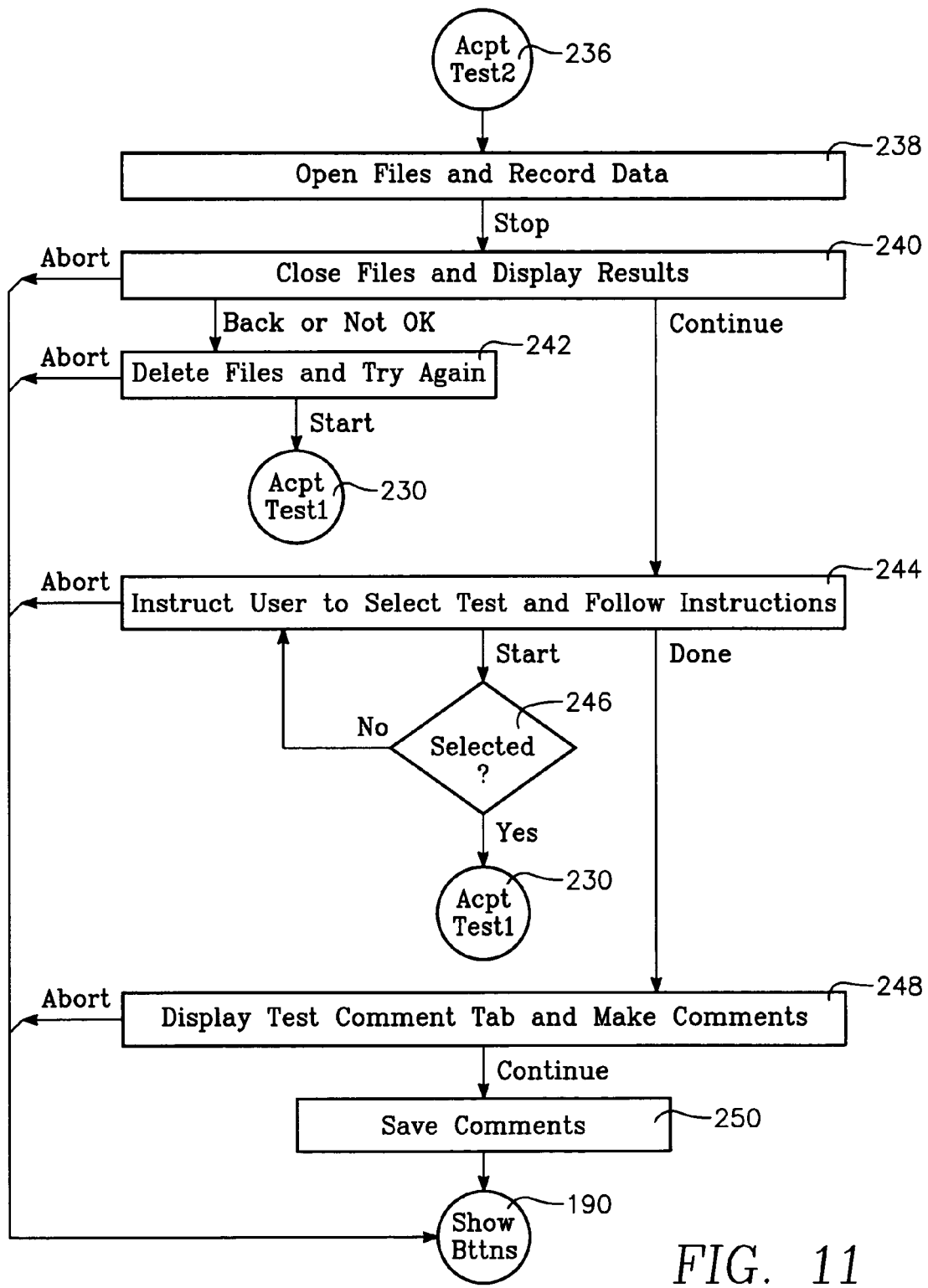

Referring to FIGS. 1, 2, 10 and 11, the acceptance test dialog is depicted in the flow chart of FIG. 10. Upon clicking the "Acceptance" button the user is presented with a Save Acceptance Test Data dialog (program step 214) to establish a base filename to be used in creating a set of files in which to document the test. These files will consist of a test summary text file and a set of JTU and Reference Receiver source files for each subtest. Six subtests make up a complete Acceptance Test. When the user enters a filename (program step 218) a scan is performed in the designated folder in which to save these files to ensure that there are no filename conflicts. If there is a potential conflict the user is informed and requested to select another name. The user is not permitted to overwrite or append any data to an existing file. If the user chooses to cancel out of this dialog the program will return to the location before the "Acceptance" button was clicked (program steps 216 and 190). Table X shows a sample set of filenames along with their descriptions for a base filename of accept.

TABLE X

| Filename | File Description |
| --- | --- |
| accept.txt | Acceptance test summary text file |
| accept_AX1.jtu | JTU source for the first part of the X-axis Accelerometer test |
| accept_AX1.ref | Reference Receiver source for the first part of the X-axis Accelerometer test |
| accept_AX2.jtu | JTU source for the second part of the X-axis Accelerometer test |
| accept_AX2.ref | Reference Receiver source for second part of the X-axis Accelerometer test |
| accept_RX1.jtu | JTU source for the first part of the X-axis Rate Sensor test |
| accept_RX1.ref | Reference Receiver source for the first part of the X-axis Rate Sensor test |
| accept_RX2.jtu | JTU source for the second part of the X-axis Rate Sensor test |
| accept_RX2.jtu | Reference Receiver source for the second part of the X-axis Rate Sensor test |

Once the user has established an appropriate filename an Acceptance Test Control dialog will be displayed (program step 220). Program step 222 instructs the user to select a test and follow the instructions for the test. After the user makes a selection (program step 224), the JTU Power and JTU Antenna controls in the Test Box Control dialog will be disabled (program step 226).

The specific subtest to perform is selected by clicking the appropriate radio button in the Acceptance Test Control. Once a subtest has been selected the user is presented with a diagram describing and showing how the subtest is to be performed.

Accelerometer subtest duration is specified in the JTU_Test.ini file. The default setting for this parameter is 20 seconds. During the subtest a slider is displayed to show the user the ongoing progress of the subtest.

The duration of the Rate Sensor subtest is set directly by the user via the "Start" and "Stop" buttons. The maximum duration for this subtest is 10 seconds. If this time is exceeded during the first part of the subtest the user is instructed to try that part again. If the time is exceeded during the second part of the subtest the subtest is flagged as Invalid and the user is requested to do the entire subtest again. A slider is displayed to indicate the time remaining.

Upon clicking the "Start" button the "Test Box Control" dialog will be removed to prevent any inadvertent change that would affect the test results. When each subtest has concluded the results will be displayed in the Acceptance Test Control dialog. Upon completing a particular subtest the user has the option of repeating it by clicking the "Back" button. If the user accepts the results by clicking the "Continue" button that particular subtest cannot be repeated unless the entire Acceptance Test is started over. Upon accepting the results of each subtest the user has the option of ending the test by clicking the "Done" button or performing another subtest by clicking the "Continue" button. If all six subtests have been performed the user will not be permitted to perform another one and the only option is to click the "Done" button to end the test. Upon clicking the "Done" button the user is given the opportunity to make any appropriate comments under the Test Comments tab after which clicking the "Continue" button will cause a summary of all subtests performed to be generated and saved.

The following is an illustrative example of an Acceptance Test in accordance with the preferred embodiment of the present invention.

Acceptance Test Sample Summary Test File
Title: Test Data Summary

Part #: 1234  Serial #: 5678
Date: Sep. 17, 2004
Time: 10:46:06
Tester: Joe Smith
Acceptance Test Average Bias Criteria:
Accelerometer Tests (m/s/s)

| X Axis (Max; Min) | Y Axis (Max; Min) | Z Axis (Max; Min) |
| --- | --- | --- |
| 1.000000; | 1.000000; | 1.000000; |
| −1.000000 | −1.000000 | −1.000000 |

Rate Sensor Tests (d/s/s)

| X Axis (Max; Min) | Y Axis (Max; Min) | Z Axis (Max; Min) |
| --- | --- | --- |
| 0.005000; | 0.005000; | 0.005000; |
| −0.005000 | −0.005000 | −0.005000 |

Acceptance Test Results:

Accelerometer X Axis Test: −1.990525 m/s/s (Failed)
Accelerometer Y Axis Test: Not Performed
Accelerometer Z Axis Test: Not Performed
Rate Sensor X Axis Test: −0.000753 d/s/s (Passed)
Rate Sensor Y Axis Test: 0.003645 d/s/s (Passed)
Rate Sensor Z Axis Test: Not Performed
Additional Files Supporting this Acceptance Test C:\JTU\Functional.txt
C:\JTU\Acceptance_AX1.ref
C:\JTU\Acceptance_AX1.jtu
C:\JTU\Acceptance_AX2.ref
C:\JTU\Acceptance_AX2.jtu
C:\JTU\Acceptance_RX1.ref
C:\JTU\Acceptance_RX1.jtu
C:\JTU\Acceptance_RX2.ref -continued Acceptance Test Sample Summary Test File
Title: Test Data Summary C:\JTU\Acceptance_RX2.jtu
C:\JTU\Acceptance_RY1.ref
C:\JTU\Acceptance_RY1.jtu
C:\JTU\Acceptance_RY2.ref
C:\JTU\Acceptance_RY2.jtu
Additional Comments
This test was incomplete.

Referring to FIGS. 1, 2 and 9, FIG. 9 is a flow chart depicting the Qualification test dialog utilized to test the JTU. The Qualification test was developed to qualify the performance of the JTU 22 and 44 under a variety of environmental test conditions. Upon clicking the "Qualify" button (program step 188), the JTU Receiver tab is displayed to give the user the option of changing the test criteria. It is at this point that the user can establish the minimum required number of messages (Epochs Required) for the test. In addition, the JTU Power and JTU Antenna controls in the Test Box Control dialog will be disabled (FIG. 26). Following any potential changes and verification of the test criteria (program step 192), clicking the "Continue" button will bring up a Save Qualification Test Data dialog (program step 194). This dialog is used to establish a set of three files in which to document the test (program step 198).

The Qualification test will not proceed unless the user establishes these files. If the user cancels out of the Save Qualification Test Data dialog by clicking the "Cancel" button a message will be displayed informing the user that the function failed and to click the "Continue" button to try again (program step 196).

Once the user has established an appropriate set of files in which to record the test results the JTU Evaluation tab is displayed. The user is then instructed to click the "Start" button to begin the test (program step 200). Upon clicking the "Start" button a slider bar appears, the Test Box Control disappears and the user is informed that the data is being recorded (program step 202). This slider bar will give the user an indication of the progress made in recording the data from the minimum required number of messages (Epochs Required) established in the test criteria. Once the minimum required number of messages has been received and recorded the slider bar will disappear (program step 204) and the user will be instructed to click the "Stop" button to end the test (program step 206). When the "Stop" button is clicked files are closed (program step 208) and the user will be shown the Test Comments tab, instructed to make any appropriate comments (program step 210) and then click the "Continue" button. This will complete the test, save comments (program step 212), generate and save a summary of the test and close all opened files.

The Qualification Test results are saved in a set of three files that were established in the Save Qualification Test Data dialog. Two of these files (filename.jtu and filename.ref) are used to record the source data from the JTU and the Reference Receiver. The third file (filename.txt) is a test summary text file (similar to the Functional Test summary) that contains a summary of the performance of the IMU and GPS Sensor components of the JTU.

Next the user is shown a fully enabled Test Box Control dialog as well as the "Acceptance", "Qualify", and "Funct/ Abort" buttons. This provides the user with full control over the test set and the option of performing any test or exiting the program.

The following is an illustrative example of a Functional Test Summary in accordance with the preferred embodiment of the present invention.

Functional Test Sample Summary Test File

Title: Test Data Summary
Part #: 1234   Serial #: 5678
Date: Sep. 17, 2004
Time: 10:35:34
Tester: Joe Smith
Power Consumption Voltage    Current
28.3       0.123
JTU Test Requirements Minimum Satellites 4             Maximum Delta Position 8 meters
Minimum Data Samples 100         Maximum Delta C/No Mean 2 dB-Hz
Maximum LockTime Resets 50
JTU Test Duration
Run Time 20 seconds.
Samples Taken 198

| | | | |
|---|---|---|---|
| Functional Test: | Satellites Detected | Satellites Used | Channels Passed |
| Results: | 9 | 9 | 9 |
| | TimeStamp Passed | Acquisition Time 0.000 | |

IMU Results: Accelerometers & Rate Sensors

Accelerometers

| | X Axis | Y Axis | Z Axis |
|---|---|---|---|
| Bias Criteria (m/s/s) | 1.000000; −1.000000 | 11.000000; 8.000000 | 1.000000; −1.000000 |
| Accumulated Deltas | −31.611466 m/s | 211.891880 m/s | 6.967502 m/s |
| Average Biases | −2.004424 m/s/s | 13.411024 m/s/s | 0.446206 m/s/s |
| Average Noise | 0.010467 m/s | 0.008842 m/s | 0.010976 m/s |
| Bias Result | Fail | Fail | Pass |

Rate Sensors

| | X Axis | Y Axis | Z Axis |
|---|---|---|---|
| Bias Criteria (d/s/s) | 0.005000; −0.005000 | 0.005000; −0.005000 | 0.005000; −0.005000 |
| Accumulated Deltas | −0.008614 d/s | 0.055797 d/s | 0.015279 d/s |
| Average Biases | −0.000592 d/s/s | 0.003531 d/s/s | 0.000924 d/s/s |
| Average Noise | 0.000275 d/s | 0.000212 d/s | 0.000248 d/s |
| Bias Result | Pass | Pass | Pass |

Delta C/No Measurements

| Satellite | Mean (dB-Hz) | StdDev | Samples | Lock Time Resets | Test Results |
|---|---|---|---|---|---|
| 27 | −0.742424 | 0.953101 | 198 | 0 | Passed |
| 13 | −0.671717 | 0.880948 | 198 | 0 | Passed |

-continued

| | | | | | |
|---|---|---|---|---|---|
| 20 | −0.717172 | 1.073467 | 198 | 0 | Passed |
| 4 | −0.550505 | 0.956094 | 198 | 0 | Passed |
| 25 | −0.636364 | 1.004581 | 198 | 0 | Passed |
| 11 | −0.949495 | 0.962674 | 198 | 0 | Passed |
| 16 | −0.989899 | 0.797660 | 198 | 0 | Passed |
| 1 | 0.000000 | 0.000000 | 0 | 0 | Inconclusive |
| 23 | −0.338384 | 0.938321 | 198 | 0 | Passed |

| Delta Position Measurements | | | |
|---|---|---|---|
| Mean (meters) | StdDev | Samples | Test Result |
| 5.295066 | 3.162212 | 198 | Passed |

IMU Test Results: FAIL.
TSPI Test Results: PASS.
Overall Test Results: FAIL.

IMU Test Summary

Accelerometers(X, Y) Axis Failed Test Criteria.

RateSensors(X, Y, Z) Axis Passed Test Criteria.

TSPI Test Summary 8 channels passed with satellites having a mean C/No delta less than 2.000 and fewer than 50 LockTime Resets on the Test receiver (minimum was 4 satellites).

One channel was inconclusive and did not meet the required 100 minimum consecutive samples.

The mean position delta passed. The mean position delta of 5.3 meters was within the 8.0 meter maximum.

The reference receiver tracked 9 satellites with at least 100 samples.

The test receiver tracked 9 satellites with at least 100 samples.

Additional Comments
This is a Test of the test software.
From the foregoing, it is readily apparent that the present invention comprises a new, unique, and exceedingly useful missile time-space-position-information unit test software program which constitutes a considerable improvement over the known prior art. Many modifications and variations of the present invention are possible in light of the above teachings. It is to be understood that within the scope of the appended claims the invention may be practiced otherwise than as specifically described.

What is claimed is:
1. A test apparatus for testing a Joint Advanced Missile Instrumentation Time-Space-Position Information Unit (JTU) located on board an airborne weapons system comprising:
an antenna for receiving RF (radio frequency) signals which include GPS data from a plurality of satellites orbiting the earth;
an antenna splitter connected to said antenna to receive said RF signals from said antenna, said antenna splitter splitting said RF signals including said GPS data;
a reference receiver connected to said antenna splitter to receive said RF signals including said GPS data from said antenna splitter, said reference receiver, in response to said RF signals including said GPS data, providing satellite ephemeris data which contains information as to said satellites which are in a field of view for said reference receiver including orbital information about said satellites, and satellite timing data which is used to compute location for each of said plurality of satellites;
said JTU being connected to said antenna splitter to receive said RF signals including said GPS data from said antenna splitter, said JTU providing location data which is measured with respect to a current location for said JTU wherein said GPS data is used to test a GPS sensor within said JTU; and
a test computer connected to said reference receiver to receive said satellite ephemeris data and said JTU to receive said location data, said test computer processing said satellite ephemeris data and said location data to provide an exact location for said JTU expressed as a latitude, a longitude and an altitude for said JTU.

2. The test apparatus of claim 1 further comprising a first power source connected to said JTU and a second power source connected to said reference receiver, said first power source and said second power source providing a direct current voltage respectively to said JTU and said reference receiver.

3. The test apparatus of claim 2 wherein said direct current voltage is approximately 28 VDC.

4. The test apparatus of claim 1 wherein said test computer includes a COM1 port connected to said reference receiver and a COM2 port connected to said JTU, said COM1 port receiving said satellite ephemeris data and said COM2 port receiving said location data in an RS-232 formatted data stream.

5. A test apparatus for testing a Joint Advanced Missile Instrumentation Time-Space-Position Information Unit (JTU) located on board an airborne weapons system comprising:
an antenna for receiving RF (radio frequency) signals which include GPS data from a plurality of satellites orbiting the earth;
an antenna splitter connected to said antenna to receive said RF signals from said antenna, said antenna splitter splitting said RF signals including said GPS data;
a reference receiver connected to said antenna splitter to receive said RF signals including said GPS data from said antenna splitter, said reference receiver, in response to said RF signals including said GPS data, providing satellite ephemeris data which contains information as to said satellites which are in a field of view for said reference receiver including orbital information about said satellites, and satellite timing data which is used to compute location for each of said plurality of satellites;
a plurality of test set switches connected to said antenna splitter to receive said RF signals;
a first power supply connected to said test set switches for generating a direct current voltage which is provided to said test set switches;
said JTU being connected to said test set switches to receive said RF signals including said GPS data when said test set switches are configured to supply said RF signals to said JTU and said direct current voltage when said test set switches are configured to supply said direct current voltage to said JTU;
a programmed gate array connected to said test set switches and said JTU, said programmed gate array providing control bits to said test set switches, said test set switches responsive to said control bits configuring said test set switches to first provide said direct current voltage to said JTU to power said JTU and then provide said RF signals to said JTU after a power up time period;

said JTU upon receiving said RF signals from said test set switches providing location data which is measured with respect to a current location for said JTU wherein said GPS data is used to test a GPS sensor within said JTU;

a converter connected to said programmed gate array and said reference receiver to convert said satellite ephemeris data and said location data from a first format to a second format; and a test computer connected to said converter to receive said satellite ephemeris data and said JTU to receive said location data, said test computer processing said satellite ephemeris data and said location data to provide an exact location for said JTU expressed as a latitude, a longitude and an altitude for said JTU.

6. The test apparatus of claim 5 further comprising:

a second power supply for generating said direct current voltage; and a power switch having a first terminal connected to said first power supply, a second terminal connected to said second power supply and a third terminal connected to said test set switches, said power switch allowing a user to select between said first power supply and said second power supply to provide said direct current voltage through said test set switches to said JTU.

7. The test apparatus of claim 6 wherein said direct current voltage is approximately 28 VDC.

8. The test apparatus of claim 5 wherein said power up time period is approximately twenty seconds.

9. The test apparatus of claim 5 wherein said converter comprises a four channel RS-232 to USB (universal serial bus) converter which converts said satellite ephemeris data provided by said reference receiver and said location data provided by said JTU from an RS-232 format to a USB format allowing said test computer to receive and process said satellite ephemeris data and said location data.

10. The test apparatus of claim 5 wherein said programmed gate array receives said location data from said JTU in a Time-Space-Position-Information Unit Message Structure (TUMS) formatted data stream and converts said location data to an RS-232 formatted data stream.

11. The test apparatus of claim 5 wherein said power up time period is used to perform a test of an operational requirement for said JTU to acquire said RF signals including said GPS data after said power up time period expires, said test computer initializing said test by supplying power up test signals through said converter to said programmed gate array.

12. The test apparatus of claim 5 wherein a user utilizes an inertial measurement unit software test routine within said test computer to verify an inertial measurement unit component of said JTU is operational, said test computer processing inertial measurement unit information contained in a TUMS formatted data stream received from said JTU to verify said inertial measurement unit is operational.

13. A test apparatus for testing a Joint Advanced Missile Instrumentation Time-Space-Position Information Unit (JTU) located on board an airborne weapons system comprising:

an antenna for receiving RF (radio frequency) signals which include GPS data from a plurality of satellites orbiting the earth;

an antenna splitter connected to said antenna to receive said RF signals from said antenna, said antenna splitter splitting said RF signals including said GPS data;

a reference receiver connected to said antenna splitter to receive said RF signals including said GPS data from said antenna splitter, said reference receiver, in response to said RF signals including said GPS data, providing satellite ephemeris data which contains information as to said satellites which are in a field of view for said reference receiver including orbital information about said satellites, and satellite timing data which is used to compute location for each of said plurality of satellites;

a plurality of test set switches connected to said antenna splitter to receive said RF signals;

a first power supply connected to said test set switches for generating a direct current voltage which is provided to said test set switches;

said JTU being connected to said test set switches to receive said RF signals including said GPS data when said test set switches are configured to supply said RF signals to said JTU and said direct current voltage when said test set switches are configured to supply said direct current voltage to said JTU;

a programmed gate array connected to said test set switches and said JTU, said programmed gate array providing control bits to said test set switches, said test set switches responsive to said control bits configuring said test set switches to first provide said direct current voltage to said JTU to power said JTU and then provide said RF signals to said JTU after a power up time period;

said JTU upon receiving said RF signals from said test set switches providing location data which is measured with respect to a current location for said JTU wherein said GPS data is used to test a GPS sensor within said JTU;

a four channel RS-232 to USB (universal serial bus) converter connected to said programmed gate array and said reference receiver to convert said satellite ephemeris data and said location data from an RS-232 format to a USB format;

a test computer connected to said four channel RS-232 to USB converter to receive said satellite ephemeris data and said JTU to receive said location data in said USB format, said test computer processing said satellite ephemeris data and said location data to provide an exact location for said JTU expressed as a latitude, a longitude and an altitude for said JTU, said test computer including a computer software program to control, handle and interpret said satellite ephemeris data provided by said reference receiver and said location data provided by said JTU;

a second power supply for generating said direct current voltage; and a power switch having a first terminal connected to said first power supply, a second terminal connected to said second power supply and a third terminal connected to said test set switches, said power switch allowing a user to select between said first power supply and said second power supply to provide said direct current voltage through said test set switches to said JTU.

14. The test apparatus of claim 13 wherein said power up time period is approximately twenty seconds.

15. The test apparatus of claim 13 wherein said direct current voltage is approximately twenty seconds.

16. The test apparatus of claim 13 wherein said programmed gate array receives said location data from said JTU in a Time-Space-Position-Information Unit Message Structure (TUMS) formatted data stream and converts said location data to an RS-232 formatted data stream.

17. The test apparatus of claim 13 wherein said power up time period is used to perform a test of an operational requirement for said JTU to acquire said RF signals including said GPS data after said power up time period expires, said test computer initializing said test by supplying power up test signals through said four channel RS-232 to USB converter to said programmed gate array.

18. The test apparatus of claim 13 wherein said user utilizes an inertial measurement unit software test routine within said test computer to verify a inertial measurement unit component of said JTU is operational, said test computer processing inertial measurement unit information contained in a TUMS formatted data stream received from said JTU to verify said inertial measurement unit is operational.

19. The test apparatus of claim 13 wherein said computer software program is designed to operate in a Windows 2000 operating system environment which is hosted on a 750 MHz desktop personal computer.

20. The test apparatus of claim 13 wherein said test apparatus requires at least four satellites to provide said exact location for said JTU expressed as said latitude, said longitude and said altitude for said JTU and a minimum time for acquiring said RF signals including said GPS data of sixty seconds.

* * * * *